Nov. 1, 1927.
O. C. REEVES
WEIGHING SCALE
1,647,308
Original Filed May 31, 1924
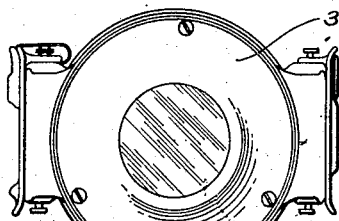
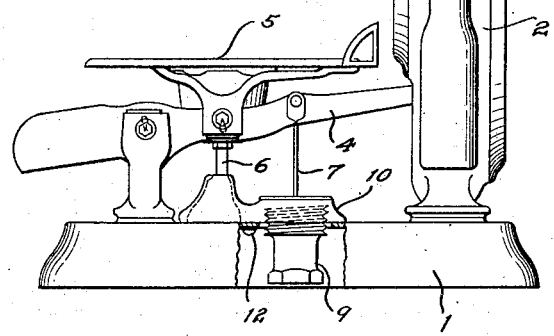
Fig. I.
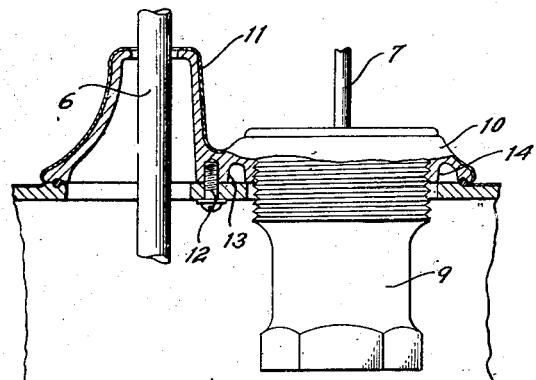
Fig. II.
Inventor
ORWELL C. REEVES
By C. O. Marshall
Attorney

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

WEIGHING SCALE.

Original application filed May 31, 1924, Serial No. 717,033, and in Canada July 11, 1924. Divided and this application filed January 24, 1927. Serial No. 163,004.

This is a division of my application for improvements in weighing scales, Serial Number 717,033, filed May 31, 1924, and relates particularly to scales of the so-called cylinder type, and one of its principal objects is to provide an improved means for mounting a dash pot in the weighing scale.

Another object of the invention is the provision of means to improve the appearance of joints between the scale frame and dash pot when such parts are finished in porcelain enamel or other vitreous coating.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevation of a weighing scale of the cylinder type;

Figure II is an enlarged fragmentary detain sectional view of a portion of the base of the scale showing the method of mounting the dash pot.

Referring to the drawings, the base 1, upright housing 2, chart housing 3, lever 4, commodity-receiver 5 and load-counterbalancing mechanism (not shown) are of the same general construction as that illustrated and described in U. S. Patent to Hapgood, No. 1,166,128, patented December 28, 1915. The framework, housings and the exposed working parts of the scale of the present invention are, however, intended to be finished in porcelain enamel or with other vitreous coating, and one of the main features of this invention is particularly valuable when employed in scales so finished.

The commodity-receiver 5 is connected by means of a spider stem 6 to a check link (not shown) which is located under the base, and the lever 4 is connected by means of a plunger rod 7 to a dash pot or vibration retarding means 9. In order to protect the spider stem 6 and give the portion of the base surrounding the openings through which the spider stem 6 and the plunger rod 7 pass a finished appearance, as well as to form a cover for and support for the dash pot 9, I have designed the member 10. This member is also designed to be finished in porcelain enamel, as indicated at 11. It is secured to the base 1 by means of a screw 12 extending from beneath the base into a boss 13 formed on the member 10. The upper end of the dash pot is threaded into a large internally threaded boss 14 so that when it is desired to refill the dash pot or remove it for any purpose it may be removed from beneath the base by merely unscrewing it.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, a frame having an opening, a cover for said opening, and a dash pot secured to said cover and extending downwardly through said opening.

2. In a weighing scale, in combination, a base having an opening, a cover for said opening, and a dash pot secured to said cover and extending downwardly through said opening.

3. In a weighing scale, in combination, a vitreous coated scale frame having an opening, a vitreous coated cover for said opening, and a dash pot secured to said cover and extending downwardly through said opening.

4. In a weighing scale, in combination, a vitreous coated base having an opening, a vitreous coated cover for said opening, and a dash pot secured to said cover and extending downwardly through said opening.

ORWELL C. REEVES.